(12) United States Patent
Coonan et al.

(10) Patent No.: US 6,394,402 B2
(45) Date of Patent: *May 28, 2002

(54) VERTICALLY ADJUSTABLE MOBILE COMPUTER WORKSTATION

(75) Inventors: Gary Coonan, Rockvale; Gary L. Mayes, Murfreesboro; Donald Ray Reckelhoff, Antioch, all of TN (US)

(73) Assignee: Stinger Industries, LLC, Murfreesboro, TN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/388,334

(22) Filed: Sep. 1, 1999

(51) Int. Cl.$^7$ ................................................. A47F 7/00
(52) U.S. Cl. ................................................. 248/123.11
(58) Field of Search .................... 248/123.11, 122.1, 248/124.1, 280.11, 284.1, 278.1, 292.11, 292.13, 285.1, 286.1, 646, 648, 660–662, 664, 920–923, 654; 312/223.3, 351.11; 108/4–8, 139, 141, 142, 50.01; 182/2.7–2.8

(56) References Cited

U.S. PATENT DOCUMENTS

| | | | |
|---|---|---|---|
| 2,841,410 A | | 7/1958 | Kessler, Jr. et al. |
| 4,073,556 A | | 2/1978 | Wilson, Jr. |
| 4,252,213 A | * | 2/1981 | Ekman ........................ 182/2.7 |
| 4,365,561 A | * | 12/1982 | Tellier et al. ................... 108/7 |
| 4,428,631 A | * | 1/1984 | Cope et al. .................. 312/194 |
| 4,456,093 A | * | 6/1984 | Finley et al. ................. 182/2.8 |
| 4,567,835 A | * | 2/1986 | Reese et al. .................... 108/7 |
| 4,572,594 A | | 2/1986 | Schwartz |
| 4,635,893 A | * | 1/1987 | Nelson ........................ 248/558 |
| 4,638,969 A | * | 1/1987 | Brown ...................... 248/122.1 |
| 4,640,199 A | | 2/1987 | Zigman |
| 4,721,213 A | * | 1/1988 | Eitel .............................. 182/2.8 |
| 4,729,533 A | * | 3/1988 | Hilliary et al. .............. 248/184 |
| 4,779,922 A | * | 10/1988 | Cooper ................ 248/122.1 X |
| 4,836,478 A | | 6/1989 | Sweere |
| 4,844,387 A | * | 7/1989 | Sorgi et al. ............... 248/281.1 |
| 4,917,214 A | * | 4/1990 | Mlaker et al. ............... 182/2.8 |
| 5,033,804 A | | 7/1991 | Faris |
| 5,072,999 A | | 12/1991 | Trotta et al. |
| 5,108,063 A | * | 4/1992 | Koerber, Sr. et al. ........ 248/284 |
| 5,196,998 A | * | 3/1993 | Fulton .......................... 182/2.8 |
| 5,271,669 A | | 12/1993 | Pearlson |
| 5,275,482 A | * | 1/1994 | Grant ....................... 312/235.9 |
| 5,348,324 A | * | 9/1994 | Trotta .......................... 248/921 |
| 5,364,177 A | | 11/1994 | Ugalde |
| 5,374,019 A | * | 12/1994 | Fischer .................... 248/122.1 |
| 5,377,951 A | | 1/1995 | Johnson et al. |
| 5,408,939 A | | 4/1995 | Lechman |
| 5,450,800 A | | 9/1995 | Leonard |
| 5,480,224 A | | 1/1996 | Ugalde |
| 5,489,938 A | | 2/1996 | Maruyama et al. |
| 5,501,420 A | * | 3/1996 | Watt et al. ............. 248/280.11 |
| 5,518,310 A | | 5/1996 | Ellman et al. |
| 5,522,323 A | | 6/1996 | Richard |
| 5,564,522 A | * | 10/1996 | Markin et al. ................ 182/2.7 |
| 5,584,546 A | | 12/1996 | Gurin et al. |

(List continued on next page.)

Primary Examiner—Daniel P. Stodola
Assistant Examiner—Jennifer E. Novosad
(74) Attorney, Agent, or Firm—Liell & McNeil (57) ABSTRACT

A vertically adjustable mobile computer workstation includes a first arm which has an upper end and a lower end. Attached to the upper end of the first arm is at least one platform. A second arm includes an upper end and a lower end. The lower end of the first arm and the upper end of the second arm are hingedly attached. The lower end of the second arm is attached to a base that is supported by a plurality of rotatable members. The first arm is rotatable between a first angular position in which the at least one platform is positioned above the rotatable members and a second angular position in which the at least one platform is positioned higher above the rotatable members.

19 Claims, 5 Drawing Sheets

U.S. PATENT DOCUMENTS

| | | | |
|---|---|---|---|
| 5,630,566 A | * | 5/1997 | Case .................. 248/221.1 |
| 5,671,091 A | * | 9/1997 | Monroe et al. ............ 108/9 |
| 5,765,797 A | | 6/1998 | Greene et al. |
| 5,826,846 A | | 10/1998 | Buccieri et al. |
| 5,913,582 A | | 6/1999 | Coonan |
| 5,918,841 A | * | 7/1999 | Sweere et al. ........ 248/123.11 |
| 6,041,242 A | * | 3/2000 | Coulthard .......... 248/122.1 X |
| 6,098,936 A | * | 8/2000 | Birrell ................ 248/122.1 |

* cited by examiner

Fig_2_

Fig_3_

Fig. 4

VERTICALLY ADJUSTABLE MOBILE COMPUTER WORKSTATION

TECHNICAL FIELD

The present invention relates generally to computer workstations, and more particularly to mobile computer workstations that are vertically adjustable.

BACKGROUND ART

A number of workstations have been designed to make computer use more convenient and to make the time employees spend using their computers more ergonomic. For example, various workstations have been designed which allow the user to rotate the computer output device to remain in their line of sight. These devices can allow the user to comfortably view the computer monitor whether they are sitting or standing. Systems have also been developed which suspend a computer monitor from a track and allow the monitor to roll along the track while the user moves from place to place. While these designs have increased the adaptability of office equipment, there is still room for improvement.

For example, a computer workstation that is easily movable from one location to another is desirable in a number of office settings. One example is a hospital setting where nurses and technicians must continuously update patient treatment records from a variety of locations. In this setting, a workstation that could travel with the employee could allow them to input changes in patient treatment while they are making their rounds. A workstation that is also adjustable to accommodate users in either a standing or sitting position would allow employees to carry out their tasks in a more ergonomic manner.

The present invention is directed to addressing these needs and to creating a mobile computer workstation that is adjustable to a variety of vertical positions.

SUMMARY OF THE INVENTION

A vertically adjustable mobile computer workstation includes a first arm which has an upper end and a lower end and a second arm that includes an upper end and a lower end. Attached to the upper end of the first arm is at least one platform. The lower end of the first arm and the upper end of the second arm are hingedly attached. The lower end of the second arm is attached to a base that is supported by a plurality of rotatable members. The first arm is rotatable between a first angular position in which the at least one platform is positioned a first distance above the rotatable member and a second angular position in which the platform is positioned a second distance above the rotatable members that is greater than the first distance.

BEST MODE FOR CARRYING OUT THE INVENTION

Referring now to FIGS. 1–4 there is shown a vertically adjustable mobile computer workstation 10 according to three variations of the present invention. As illustrated, computer workstation 10 can be adapted to support a variety of computer input and output devices. Computer workstation 10 includes a first arm 13, a second arm 18, a platform 11 and a base 25. Platform 11 preferably includes a handle 12 that can be used for vertical adjustment of computer workstation 10. While computer workstation 10 has been shown having only one platform 11 to support both the computer input and output devices, it should be appreciated that an additional platform could be included to allow the input and output devices to be separately supported or to provide additional work space.

Figure 5:
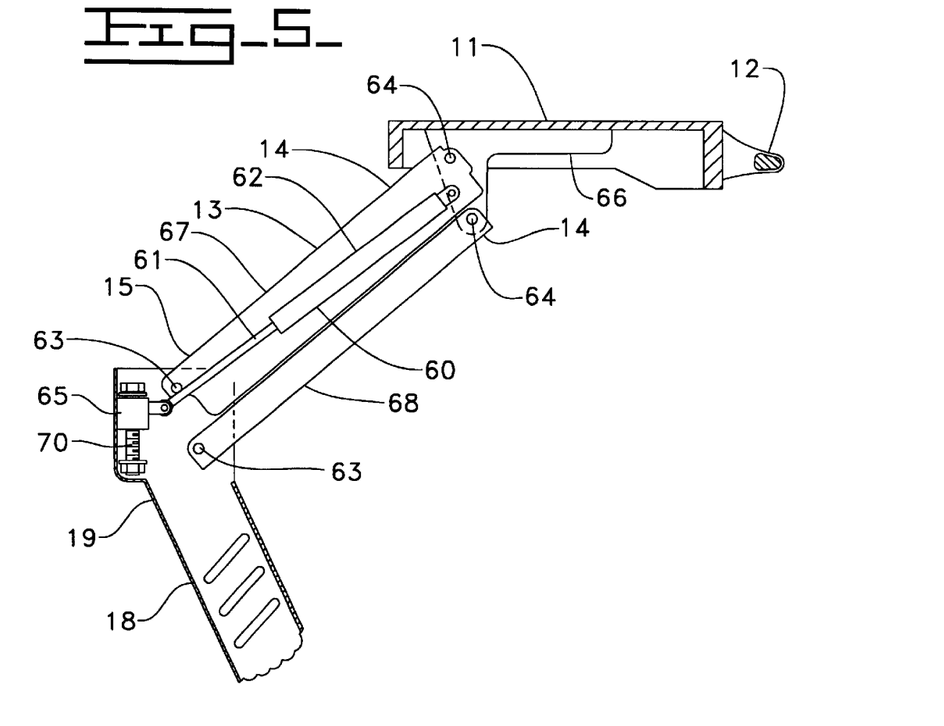
FIG. 5 is a sectioned side view of a neutral support stop mechanism according to one aspect of the invention adjusted to a raised position.
Figure 6:
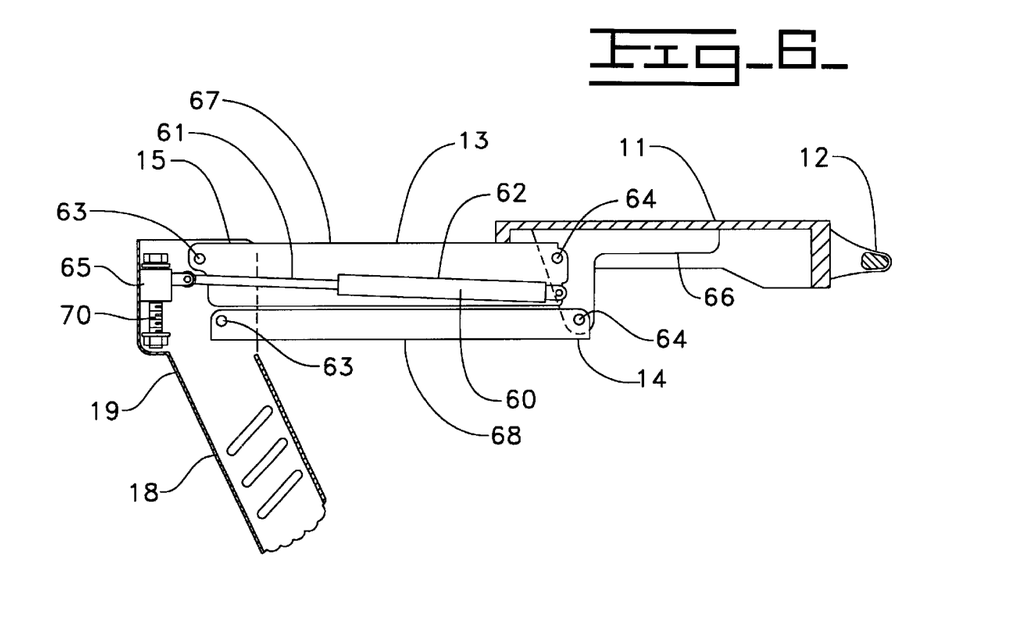
FIG. 6 is a sectioned side view of the neutral support stop mechanism of FIG. 5 adjusted to a lowered position.

Platform 11 is hingedly attached to an upper end 14 of first arm 13 by a platform support 66. Referring now in addition to FIGS. 5 and 6, it can be seen that first arm 13 is not a single member, but rather it includes a first longitudinal segment 67 and a second longitudinal segment 68 which are preferably arranged in parallel but not connected directly to each other. However, because the longitudinal segments 67, 68 function as a single member, it should be appreciated that they could be replaced by one member. Platform support 66 is attached to longitudinal segments 67, 68 by two platform pivots 64. Each platform pivot 64 can be a pin or other such device that can allow platform support 66 to maintain platform 11 at a horizontal orientation regardless of the angular position of first arm 13.

Figure 1:
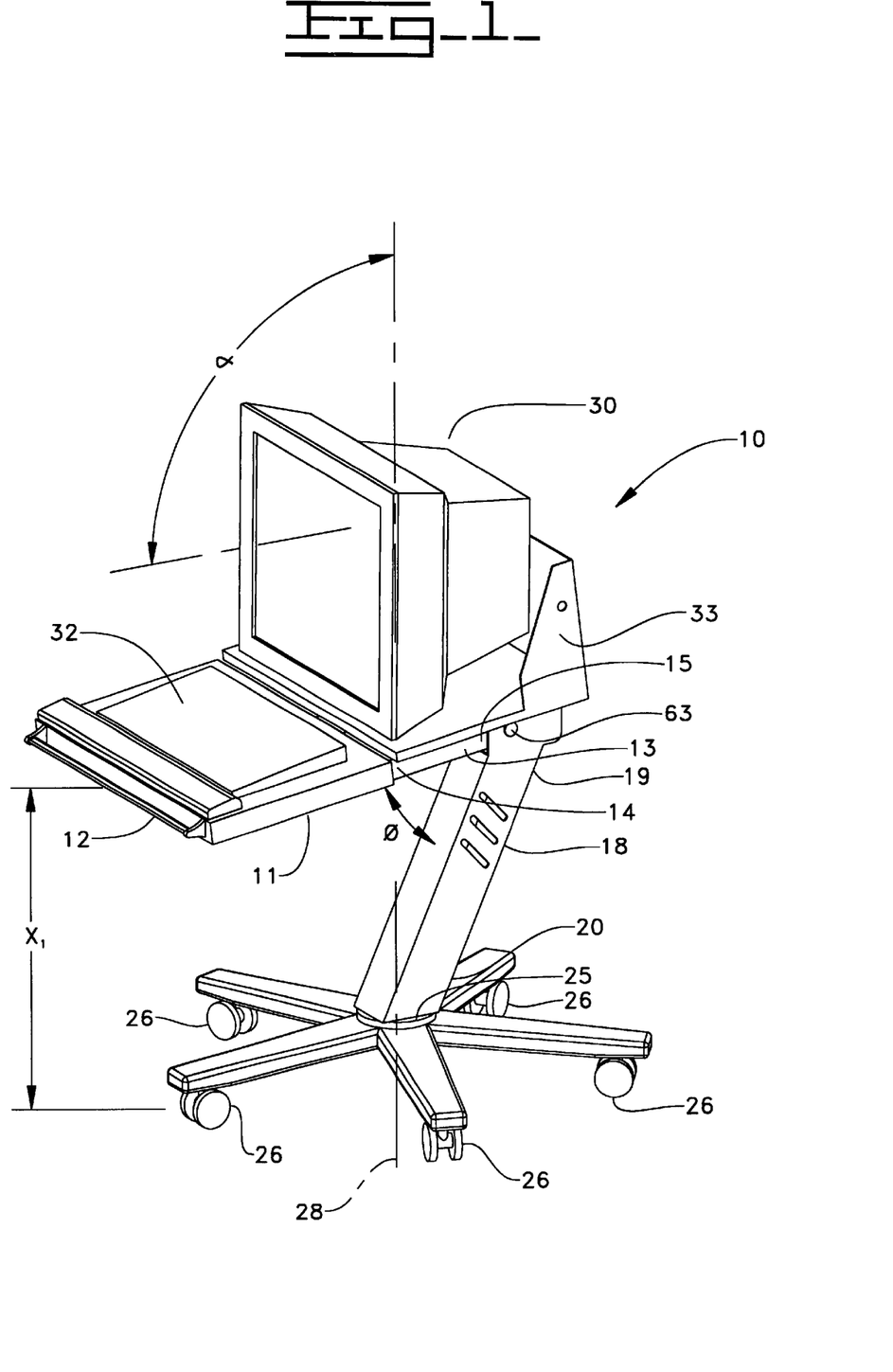
FIG. 1 is an isometric view of a vertically adjustable mobile computer workstation in a lowered position according to the present invention.
Figure 2:
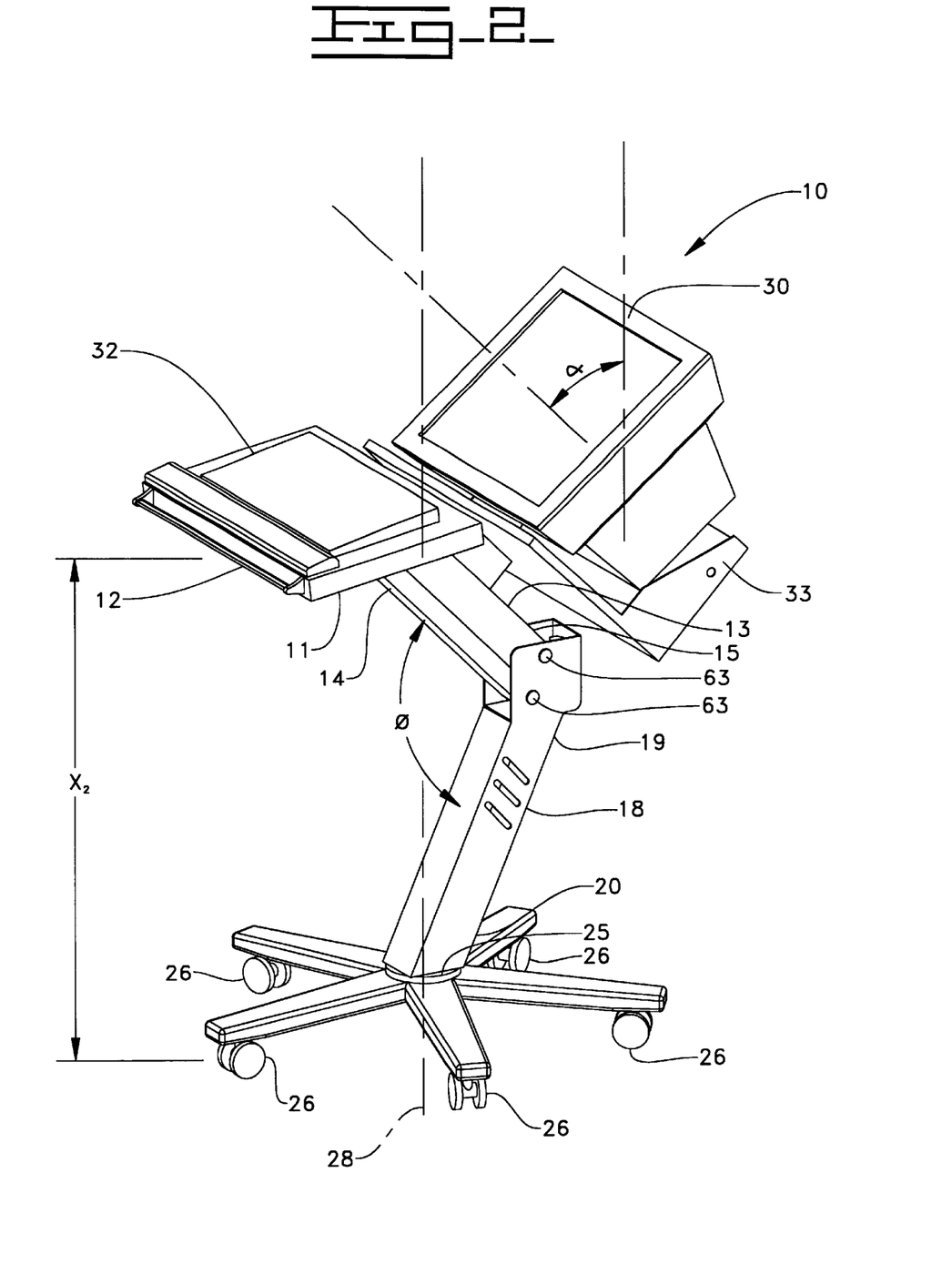
FIG. 2 is an isometric view of the vertically adjustable mobile computer workstation of FIG. 1 in a raised position.

First arm 13 also includes a lower end 15 that is hingedly attached to an upper end 19 of second arm 18 by a pair of first arm pivots 63. The vertical position of computer workstation 10 is determined by the angular position of first arm 13 with respect to second arm 18. For example, when arm angle $\phi$, the angle between first arm 13 and second arm 18, is relatively small, platform 11 is positioned a first distance $X_1$ above a plurality of rotatable members 26 that support base 25. This corresponds to a lowered position of computer workstation 10 as shown in FIG. 1. In contrast, when arm angle $\phi$ is relatively large, platform 11 is positioned a second distance $X_2$ above rotatable members 26 which corresponds to a raised position of computer workstation 10 as shown in FIG. 2. It should therefore be appreciated that as arm angle $\phi$ increases, the distance X between platform 11 and rotatable members 26 increases, resulting in an upward vertical adjustment of computer workstation 10.

Operably coupled between first arm 13 and second arm 18 is a neutral support stop mechanism 60 that serves as the mechanism which allows platform 11 to be positioned at any desired distance X above rotatable members 26. Neutral support stop mechanism 60 preferably uses an internal force producing device and friction to allow computer workstation 10 to be continuously stoppable between a preset maximum and minimum. While the present invention has been illustrated utilizing a continuously stoppable device, it should be appreciated that the stop mechanism could alternatively be a notched device, or other device, that would allow first arm 13 to stop at a plurality of preset angular positions between a desired minimum and maximum.

Figure 4:
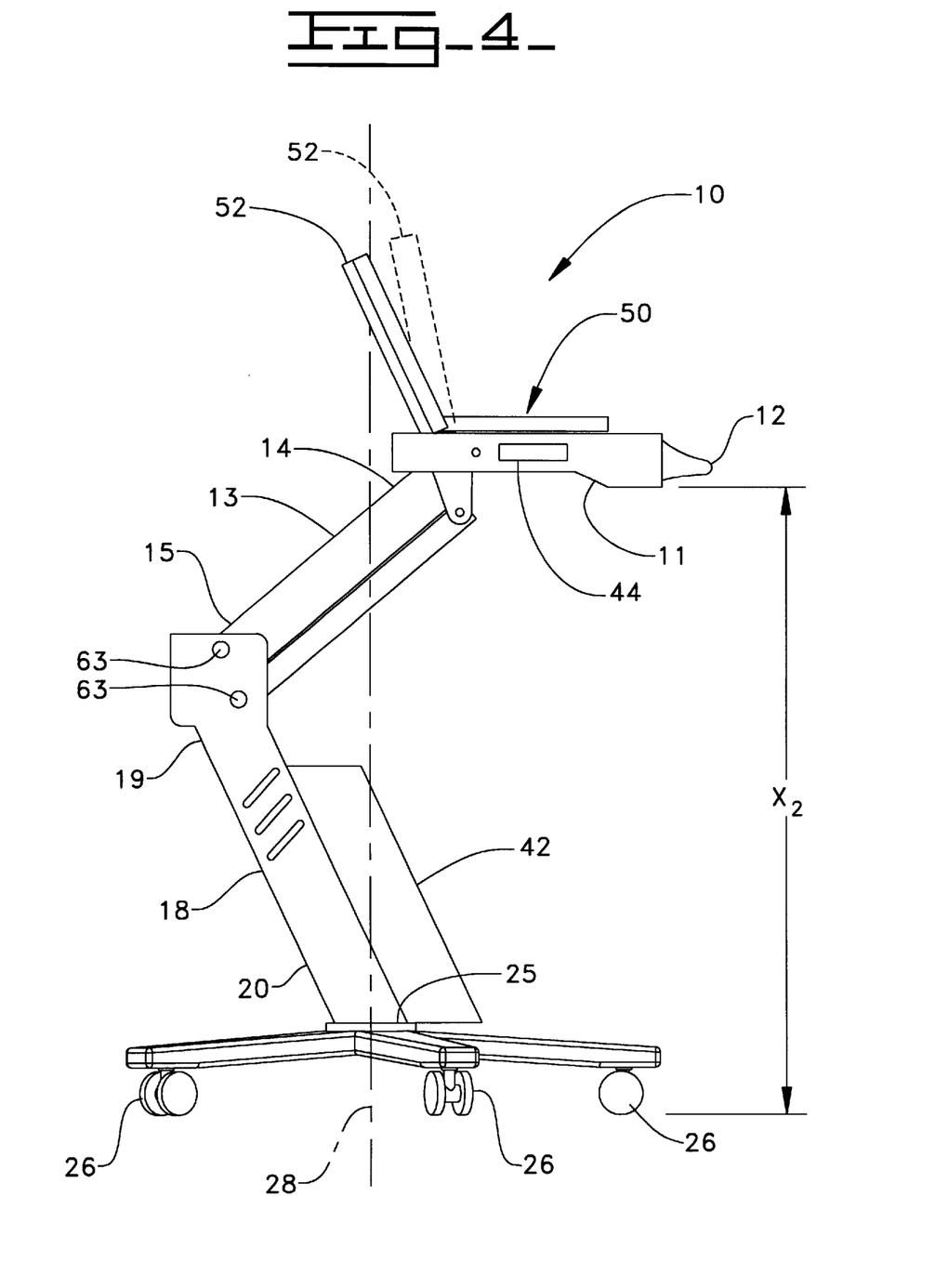
FIG. 4 is an isometric view of another variation of the vertically adjustable mobile computer workstation of FIGS. 1 and 2 in a raised position.

Neutral support stop mechanism 60 preferably includes a pneumatic cylinder, as shown, however it could be a hydraulic cylinder or other adjustable force producing device as well. Neutral support stop mechanism 60 includes a rod 61 and a cylinder 62 and is capable of producing a force proportional to the distance that rod 61 is moved with regard to cylinder 62. The amount of force that neutral support stop mechanism 60 will produce can be adjusted by a threaded member 70 that is coupled to rod 61 by a nut 65. The vertical positioning of nut 65 along threaded member 70 determines the amount of rod 61 unexposed by cylinder 62, and therefore the amount of force produced. For instance, when nut 65 is positioned high on threaded member 70, as shown in FIGS. 5 and 6, the length of rod 61 outside of cylinder 62 is relatively short, which corresponds to a relatively short pneumatic chamber within cylinder 62. This orientation would result in a greater force produced by neutral support stop mechanism 60. A greater amount of force, such as produced by this orientation, would be desirable when platform 11 is supporting a traditional tube style monitor 30, as shown in FIGS. 1 and 2. Because rod 61 preferably does not move with respect to cylinder 62 once nut 65 is adjusted and fixed on threaded member 70, neutral support stop mechanism 60 will produce this constant force regardless of the angular position of first arm 13 with respect to second arm 18. The portion of this force that is oriented in a vertical direction changes with the arm angle φ. As nut 65 is moved downward along threaded member 70, a greater length of rod 61 is removed from cylinder 62, creating a larger pneumatic chamber within cylinder 62 and thus a reduced amount of force. When nut 65 is adjusted to a relatively low position along threaded member 70, the amount of force produced would be desirable when computer workstation 10 is supporting a lighter device, such as a notebook style computer 50, as shown in FIG. 4.

Returning now to computer workstation 10, base 25 is preferably attached to a lower end 20 of second arm 18 such that an acute angle exists between second arm 18 and a vertical line passing through base 25. While the attachment between base 25 and second arm 18 has been illustrated as a fixed attachment, it should be appreciated that it could instead be a hinged attachment. Additionally, it should be appreciated that use of a hinged attachment of base 25 and second arm 18 might be facilitated with a second neutral stop mechanism. Base 25 is preferably supported by five rotatable members 26 that are equally spaced about a vertical line 28 passing through the center of base 25. Rotatable members 26 are preferably rollers, as shown, but could instead be any suitable support members, such as spherical rotatable supports. Additionally, while five rotatable members 26 have been illustrated, the number is preferably at least greater than four to ensure adequate stability of computer workstation 10. It should be appreciated, however, that the desire for added stability should be balanced with practicality when selecting the number of rotatable members 26 to be included on computer workstation 10. It should also be appreciated that the shape and size of the rotatable members 26 selected will be a factor in determining the appropriate number to use. Regarding the size of rotatable members 26, they should preferably be oversized, as shown, to make movement over rough or uneven floors easier.

Stability of computer workstation 10 is also enhanced by the positioning of platform 11 in relation to vertical line 28 which passes through the center of base 25. FIG. 1 shows computer workstation 10 adjusted to a relatively low vertical position which corresponds to a first angular position of first arm 13, as illustrated in FIG. 6. FIG. 2 shows computer workstation 10 adjusted to a relatively high vertical position, corresponding to a second angular position of first arm 13, as illustrated in FIG. 5 As shown in FIGS. 1 and 2, platform 11 is closer to vertical line 28 when computer workstation 10 is adjusted to a relatively high angular position than when computer workstation 10 is adjusted to a relatively low angular position. This design feature allows computer workstation 10 to have greater stability when adjusted to its highest vertical orientation by positioning the majority of the weight closer to the center of base 25 when computer workstation 10 is adjusted to its most unstable position.

As previously stated, computer workstation 10 can be adapted to support a number of different computer input and output devices, as shown in FIGS. 1–4. In the variation shown in FIGS. 1 and 2, platform 11 is adapted to support a computer input device in the form of a computer keyboard 32 and a computer output device in the form of traditional tube style monitor 30. Tube style monitor 30 is attached to platform 11 by a hinged monitor support 33 which pivots computer monitor 30 with respect to the vertical positioning of computer workstation 10 to accommodate use in both the sitting and standing positions. Hinged monitor support 33 rotates monitor 30 through a variety of monitor angles α that are coupled to the angular position of first arm 13. For instance, when arm angle φ is relatively small, as shown in FIG. 1, monitor angle α is relatively large. Conversely, when angle φ is relatively large, as shown in FIG. 2, monitor angle α is relatively small. This coupling allows computer monitor 30 to remain generally in the line of sight of the user regardless of the angular position of first arm 13, and therefore, regardless of the vertical orientation of computer workstation 10.

Figure 3:
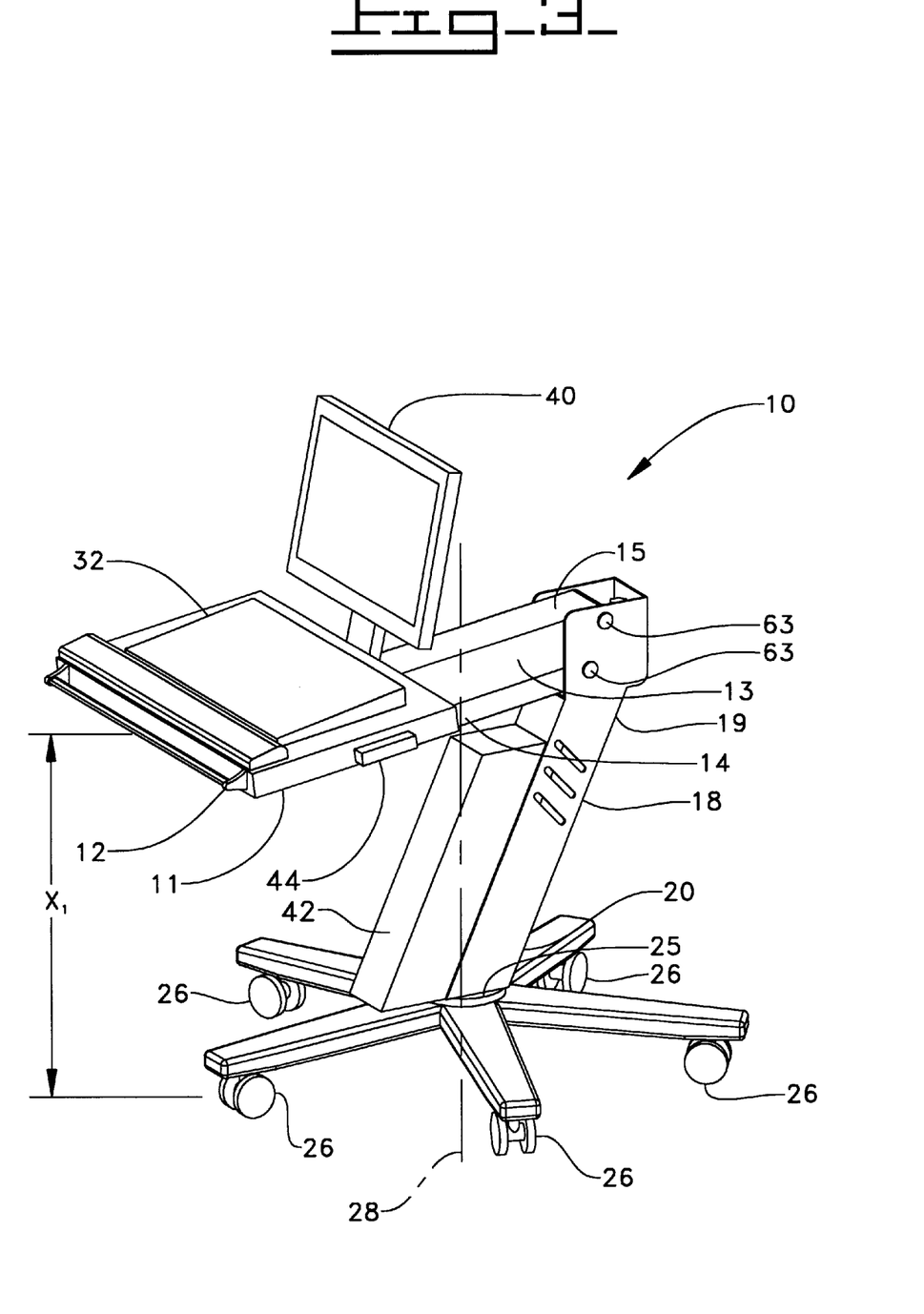
FIG. 3 is an isometric view of a variation of the vertically adjustable mobile computer workstation of FIGS. 1 and 2 in a lowered position.

Referring now to the FIG. 3 variation of computer workstation 10, platform 11 is once again designed for attachment to a computer keyboard 32 as shown in FIGS. 1 and 2. However, in this variation, platform 11 is adapted to support a flat screen computer monitor 40 as the computer output device. Because flat screen monitor 40 is readily adjustable on platform 11, there is no need to couple the monitor angle with the angular position of first arm 13, as with tube style monitor 30. However, it should be appreciated that these angles could be coupled if so desired.

In this variation, computer workstation 10 preferably includes a battery pack compartment 42 which is capable of housing a battery that can be electronically connected to at least one of computer keyboard 32 and flat screen monitor 40. While battery pack compartment 42 is preferably attached to second arm 18, it should be appreciated that it could also be attached to first arm 13, base 25 or platform 11. Use of a battery pack is desirable to allow the user to be free of many restrictions associated with power cords such as the distance the user can travel from a power source as well as the workplace hazard created by loose trailing power cords. This variation also preferably includes a wireless transceiver 44 which, when used together with a battery pack, can allow computer workstation 10 to be a completely untethered workstation. Wireless transceiver 44 is preferably attached to platform 11, however, it should be appreciated that it could also be attached to base 25, first arm 13, second arm 18, keyboard 32 or flat screen monitor 40. Use of wireless transceiver 44 will allow for even greater mobility of computer workstation 10 by allowing the user to move unrestricted by computer communication cord length. Additionally, use of wireless transceiver 44 in place of numerous cords will add to the stability and ease of use of computer workstation 10 by removing the chance of tangling cords around rotatable members 26 and once again reducing the safety hazards associated with loose cords.

Referring now to FIG. 4, there is shown still another variation of the present invention. In this variation, platform 11 is designed to support a combined computer input and output device such as notebook style computer 50. Platform 11 includes a security panel 52 for use with notebook style computer 50. Security panel 52 is attached to platform 11 in a manner that allows the user to adjust the orientation of the monitor portion of notebook computer 50 for more natural viewing. Security panel 52 is also preferably moveable between an open position in which notebook 50 can be easily placed on or removed from platform 11 and a closed position. When security panel 52 is in the closed position, it can be locked to prevent unwanted removal of notebook 50. While security panel 52 has been shown as covering only the monitor portion of notebook 50, it should be appreciated that it could also at least partially cover the keyboard portion of notebook 50. In addition to performing as a security device by allowing the user to lock down notebook 50, security panel 52 can also serve to stabilize the light notebook computer 50 on platform 11.

As with the variation shown in FIG. 3, computer workstation 10 preferably includes a battery pack compartment 42 that is attached to either first arm 13, second arm 18 or platform 11 and can be equipped with a battery to power notebook computer 50. Likewise, computer workstation 10 also preferably includes a wireless transceiver 44 to allow notebook computer 50 to act as an untethered workstation that facilitates wireless networking with a computer network and/or server. Once again, while wireless transceiver 44 has been illustrated as being attached to platform 11, it should be appreciated that it could also be attached to first arm 13, second arm 18, base 25, or notebook 50 to perform the same function.

The present invention allows for greater adaptability of office equipment by providing a self standing computer workstation that can be easily transported around a work environment. When used in conjunction with a battery pack and a wireless transceiver, the present invention becomes an untethered workstation that can be transported to virtually any location the user desires. The present invention is also vertically adjustable to provide greater versatility by ergonomically accommodating users in both the sitting and standing positions. When supporting a traditional tube style monitor, the present invention preferably includes a hinged monitor support to allow the monitor to remain in the line of sight of a user regardless of the vertical orientation of the computer workstation.

It should be understood that the above description is intended for illustrative purposes only, and is not intended to limit the scope of the present invention in any way. For instance, while the first arm is preferably two separate longitudinal segments, it should be appreciated that it could be a single member. Additionally, it should be appreciated that the number of first arm pivots and platform pivots need not be two, as illustrated. Further, it should be appreciated that separate stop and neutral force mechanisms could be used as opposed to the illustrated single integrated device. The present invention could also be modified to accommodate other input devices, such as track balls, etc. Thus, those skilled in the art will appreciate that various modifications could be made to the disclosed embodiments without departing from the intended scope of the present invention, which is defined in terms of the claims set forth below.

What is claimed is:

1. A vertically adjustable mobile computer workstation comprising:

a first arm having an upper end and a lower end;

at least one platform being attached to said upper end of said first arm;

a second arm having an upper end and a lower end;

said lower end of said first arm and said upper end of said second arm being hingedly attached;

said lower end of said second arm being attached to a base supported by a plurality of rotatable members;

a line passing through a center of said upper end of said second arm and a center of said lower end of said second arm being oriented at a fixed acute angle, greater than zero, with respect to a vertical line passing through said base;

said first arm being rotatable between a first angular position in which said at least one platform is positioned a first distance above said rotatable members and a second angular position in which said at least one platform is positioned a second distance above said rotatable members that is greater than said first distance; and wherein said first distance corresponds to a sitting user position, and said second distance corresponds to a standing user position.

2. The vertically adjustable mobile computer workstation of claim 1 further comprising a neutral support mechanism operably coupled between said first arm and said second arm.

3. The vertically adjustable mobile computer workstation of claim 1 further comprising a stop mechanism operably coupled between said first arm and said second arm.

4. The vertically adjustable mobile computer workstation of claim 1 further comprising a stop mechanism operably coupled between said first arm and said second arm; and said stop mechanism being continuously stoppable between said first angular position and said second angular position.

5. The vertically adjustable mobile computer workstation of claim 1 wherein said at least one platform includes a hinged monitor support;

said monitor support is movable between a first monitor angle and a second monitor angle; and said first monitor angle and said second monitor angle are dependent upon an angular position of said first arm.

6. The vertically adjustable mobile computer workstation of claim 1 further comprising a battery pack compartment being attached to at least one of said first arm, said second arm and said at least one platform.

7. The vertically adjustable mobile computer workstation of claim 1 further comprising a wireless transceiver attached to at least one of said first arm, said second arm, said base and said at least one platform.

8. A vertically adjustable mobile computer workstation comprising:

a first arm having an upper end and a lower end;

at least one platform being attached to said upper end of said first arm;

a second arm having an upper end and a lower end;

said lower end of said first arm and said upper end of said second arm being hingedly attached;

said lower end of said second arm being attached in a fixed orientation to a base supported by a plurality of rotatable members;

said first arm being rotatable between a first angular position in which said at least one platform is positioned a first distance above said rotatable members and a second angular position in which said at least one platform is positioned a second distance above said rotatable members that is greater than said first distance;

said at least one platform is closer to a vertical line passing through a center of said base when said first arm is at said second angular position than when said first arm is at said first angular position; and wherein said first distance corresponds to a sitting user position, and said second distance corresponds to a standing user position.

9. A vertically adjustable mobile computer workstation comprising:

a first arm having an upper end and a lower end;

at least one platform being attached to said upper end of said first arm;

a computer input device and a computer output device being supported by said at least one platform;

a second arm having an upper end and a lower end;

said lower end of said first arm and said upper end of said second arm being hingedly attached;

said lower end of said second arm being attached to a base supported by a plurality of rotatable members;

a line passing through a center of said upper end of said second arm and a center of said lower end of said second arm being oriented at a fixed acute angle, greater than zero, with respect to a vertical line passing through said base;

said first arm being rotatable between a first angular position in which said at least one platform is positioned a first distance above said rotatable members and a second angular position in which said at least one platform is positioned a second distance above said rotatable members that is greater than said first distance; and wherein said first distance corresponds to a sitting user position, and said second distance corresponds to a standing user position.

10. The vertically adjustable mobile computer workstation of claim 9 further comprising a stop mechanism operably coupled between said first arm and said second arm;

said stop mechanism being continuously stoppable between said first angular position and said second angular position; and a neutral support mechanism operably coupled between said first arm and said second arm.

11. The vertically adjustable mobile computer workstation of claim 9 wherein said at least one platform is closer to a vertical line passing through a center of said base when said first arm is at said second angular position than when said first arm is at said first angular position.

12. The vertically adjustable mobile computer workstation of claim 9 wherein said at least one platform includes a hinged monitor support;

said monitor support is movable between a first monitor angle and a second monitor angle; and said first monitor angle and said second monitor angle are dependent upon an angular position of said first arm.

13. The vertically adjustable mobile computer workstation of claim 9 further comprising a battery pack electrically connected to at least one of said computer input device and said computer output device.

14. The vertically adjustable mobile computer workstation of claim 9 further comprising a wireless transceiver attached to at least one of said first arm, said second arm, said base, said at least one platform, said computer input device and said computer output device.

15. The vertically adjustable mobile computer workstation of claim 9 further comprising a security panel being attached to said at least one platform, said security panel at least partially covering at least one of said computer input device and said computer output device.

16. A vertically adjustable mobile computer workstation comprising:

a first arm having an upper end and a lower end;

at least one platform being attached to said upper end of said first arm;

a computer input device and a computer output device being supported by said at least one platform;

a second arm having an upper end and a lower end;

said lower end of said first arm and said upper end of said second arm being hingedly attached;

said lower end of said second arm being attached to a base supported by a plurality of rotatable members;

a neutral support stop mechanism operably coupled between said first arm and said second arm;

a line passing through a center of said upper end of said second arm and a center of said lower end of said second arm being oriented at a fixed acute angle, greater than zero, with respect to a vertical line passing through said base;

said first arm being rotatable between a first angular position in which said at least one platform is positioned a first distance above said rotatable members and a second angular position in which said at least one platform is positioned a second distance above said rotatable members that is greater than said first distance; and wherein said first distance corresponds to a sitting user position, and said second distance corresponds to a standing user position.

17. The vertically adjustable mobile computer workstation of claim 16 wherein said plurality of rotatable members is a number greater than four; and said plurality of rotatable members are equally spaced about a vertical line passing through a center of said base.

18. The vertically adjustable mobile computer workstation of claim 17 further comprising a wireless transceiver attached to at least one of said first arm, said second arm, said base, said at least one platform, said computer input device and said computer output device.

19. The vertically adjustable mobile computer workstation of claim 18 wherein said at least one platform is closer to a vertical line passing through a center of said base when said first arm is at said second angular position than when said first arm is at said first angular position.

* * * * *

(12) EX PARTE REEXAMINATION CERTIFICATE (5735th)

United States Patent
Coonan et al.

(10) Number: US 6,394,402 C1
(45) Certificate Issued: Apr. 3, 2007

(54) VERTICALLY ADJUSTABLE MOBILE COMPUTER WORKSTATION

(75) Inventors: Gary Coonan, Rockvale, TN (US); Gary L. Mayes, Murfreesboro, TN (US); Donald Ray Reckelhoff, Antioch, TN (US)

(73) Assignee: Stinger Industries, LLC, Murfreesboro, TN (US)

Reexamination Request:
No. 90/007,332, Dec. 6, 2004

Reexamination Certificate for:
Patent No.: 6,394,402
Issued: May 28, 2002
Appl. No.: 09/388,334
Filed: Sep. 1, 1999

(51) Int. Cl.
*A47F 7/00* (2006.01)

(52) U.S. Cl. .................................. 248/123.11
(58) Field of Classification Search .............. 248/122.1, 248/123.11, 124.1
See application file for complete search history.

(56) References Cited

U.S. PATENT DOCUMENTS

| | | | |
|---|---|---|---|
| 4,523,732 A | 6/1985 | Biber et al. | 248/123.1 |
| 5,918,841 A * | 7/1999 | Sweere et al. | 248/123.11 |
| 6,041,242 A * | 3/2000 | Coulthard | 455/575.1 |
| 6,216,499 B1 | 4/2001 | Ronberg et al. | 70/58 |

OTHER PUBLICATIONS

Compu–CRT Publication by Stinger Industries, LLC 1 page, published prior to Sep. 1, 1998.

Deposition of Gary Coonan, vol. III, Jun. 14, 2004.

Deposition of Gary Mayes, May 25, 2004.

* cited by examiner

*Primary Examiner*—Jimmy G. Foster (57) ABSTRACT

A vertically adjustable mobile computer workstation includes a first arm which has an upper end and a lower end. Attached to the upper end of the first arm is at least one platform. A second arm includes an upper end and a lower end. The lower end of the first arm and the upper end of the second arm are hingedly attached. The lower end of the second arm is attached to a base that is supported by a plurality of rotatable members. The first arm is rotatable between a first angular position in which the at least one platform is positioned above the rotatable members and a second angular position in which the at least one platform is positioned higher above the rotatable members.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 63 to Column 4, line 12:

Stability of computer workstation 10 is also enhanced by the positioning of platform 11 in relation to vertical line 28 which passes through the center of base 25. FIG. 1 shows computer workstation 10 adjusted to a relatively low vertical position which corresponds to a first angular position of first arm 13, as illustrated in FIG. 6. FIG. 2 shows computer workstation 10 adjusted to a relatively high vertical position, corresponding to a second angular position of first arm 13, as illustrated in FIG. 5 As shown in FIGS. 1 and 2, platform 11 is closer to vertical line 28 when computer workstation 10 is adjusted to a relatively high angular position than when computer workstation 10 is adjusted to a relatively low angular position. This design feature allows computer workstation 10 to have greater stability when adjusted to its highest vertical orientation by positioning the majority of the weight closer to the center of the base 25 when computer workstation 10 is adjusted to its most unstable position. *And, it will also be noted that platform 11 is always positioned above base 25.*

AS A RESULT OF REEXAMINATION, IT HAS BEEN DETERMINED THAT:

Claims 1–4, 8–10 and 16 are determined to be patentable as amended.

Claims 5–7, 11–15 and 17–19, dependent on an amended claim, are determined to be patentable.

New claims 20 and 21 are added and determined to be patentable.

1. A vertically adjustable mobile computer workstation comprising:
   a first arm having an upper end and a lower end;
   at least one platform being attached to said upper end of said first arm;
   a second arm having an upper end and a lower end;
   *a pneumatic cylinder coupled between the first and second arms and having an end fixed to the upper end of the second arm;*
   said lower end of said first arm and said upper end of said second arm being hingedly attached;
   said lower end of said second arm being attached to a base supported by a plurality of rotatable members;
   a line passing through a center of said upper end of said second arm and a center of said lower end of said second arm being oriented at a fixed acute angle, greater than zero, with respect to a vertical line passing through said base;
   said first arm being rotatable between a first angular position in which said at least one platform is positioned a first distance above said rotatable members and a second angular position in which said at least one platform is positioned a second distance above said rotatable members that is greater than said first distance;
   *said at least one platform being always positioned above said base;* and
   wherein said first distance corresponds to a sitting user position; and said second distance corresponds to a standing user position.

2. The vertically adjustable mobile computer workstation of claim 1 further comprising a [neutral support] *stop* mechanism *that includes said pneumatic cylinder* operably coupled between said first arm and said second arm.

3. The vertically adjustable mobile computer workstation of claim [1 further comprising a] *2 wherein said* stop mechanism *comprises a neutral support stop mechanism that includes said pneumatic cylinder* operably coupled between said first arm and said second arm *and operable to produce a substantially constant force regardless of the angular position of said first arm with respect to said second arm.*

4. The vertically adjustable mobile computer workstation of claim [1 further comprising a stop mechanism operably coupled between said first arm and said second arm; and] *3 wherein* said *neutral support* stop mechanism being continuously stoppable between said first angular position and said second angular position.

8. A vertically adjustable mobile computer workstation comprising:
   a first arm having an upper end and a lower end;
   at least one platform being attached to said upper end of said first arm;
   a second arm having an upper end and a lower end;
   *a neutral support stop mechanism coupled between said first arm and said second arm and being operable to produce a substantially constant force regardless of an angular position of said first arm with respect to said second arm;*
   said lower end of said first arm and said upper end of said second arm being hingedly attached;
   said lower end of said second arm being attached in a fixed orientation to a base supported by a plurality of rotatable members;
   said first arm being rotatable between a first angular position in which said at least one platform is positioned a first distance above said rotatable members and a second angular position in which said at least one platform is positioned a second distance above said rotatable members that is greater than said first distance;
   *said at least one platform being always positioned above said base;*
   said at least one platform is closer to a vertical line passing through a center of said base when said first arm is at said second angular position than when said first arm is at said first angular position; and
   wherein said first distance corresponds to a sitting user position, and said second distance corresponds to a standing user position.

9. A vertically adjustable mobile computer workstation comprising:

a first arm having an upper end and a lower end;

at least one platform being attached to said upper end of said first arm;

a computer input device and a computer output device being supported by said at least one platform;

a second arm having an upper end and a lower end;

*a pneumatic cylinder coupled between the first and second arms and having an end fixed to the upper end of the second arm;* said lower end of said first arm and said upper end of said second arm being hingedly attached;

said lower end of said second arm being attached to a base supported by a plurality of rotatable members;

a line passing through a center of said upper end of said second arm and a center of said lower end of said second arm being oriented at a fixed acute angle, greater than zero, with respect to a vertical line passing through said base;

said first arm being rotatable between a first angular position in which said at least one platform is positioned a first distance above said rotatable members and a second angular position in which said at least one platform is positioned a second distance above said rotatable members that is greater than said first distance; and wherein said first distance corresponds to a sitting user position, and said second distance corresponds to a standing user position.

10. The vertically adjustable mobile computer workstation of claim 9 [further comprising a] *wherein said pneumatic cylinder is part of a neutral support* stop mechanism operably coupled between said first arm and said second arm;

said stop mechanism being continuously stoppable between said first angular position and said second angular position[; and a neutral support mechanism operably coupled between said first arm and said second arm].

16. A vertically adjustable mobile computer workstation comprising:

a first arm having an upper end and a lower end;

at least one platform being attached to said upper end of said first arm;

a computer input device and a computer output device being supported by said at least one platform;

a second arm having an upper end and a lower end;

said lower end of said first arm and said upper end of said second arm being hingedly attached;

said lower end of said second arm being attached to a base supported by a plurality of rotatable members;

a neutral support stop mechanism operably coupled between said first arm and said second arm, said neutral support stop mechanism being operable to produce a substantially constant force regardless of the angular position of said first arm with respect to said second arm;

a line passing through a center of said upper end of said second arm and a center of said lower end of said second arm being oriented at a fixed acute angle, greater than zero, with respect to a vertical line passing through said base;

said first arm being rotatable between a first angular position in which said at least one platform is positioned a first distance above said rotatable members and a second angular position in which said at least one platform is positioned a second distance above said rotatable members that is greater than said first distance; and wherein said first distance corresponds to a sitting user position, and said second distance corresponds to a standing user position.

*20. A vertically adjustable mobile computer workstation comprising:*

*a first arm having an upper end and a lower end;*

*at least one platform being attached to said upper end of said first arm;*

*a second arm having an upper end and a lower end;*

*said lower end of said first arm and said upper end of said second arm being hingedly attached;*

*said lower end of said second arm being attached to a base supported by a plurality of rotatable members;*

*a line passing through a center of said upper end of said second arm and a center of said lower end of said second arm oriented at a fixed acute angle, greater than zero, with respect to a vertical line passing through said base;*

*said second arm having a substantially straight elongate portion comprising a majority of a length of said second arm, which is oriented at a fixed acute angle, greater than zero, with respect to the vertical line passing through said base, when said rotatable members are at substantially the same vertical position;*

*said first arm being rotatable between a first angular position in which said at least one platform is positioned a first distance above said rotatable members and a second angular position in which said at least one platform is positioned a second distance above said rotatable members that is greater than said first distance; and*

*wherein said first distance corresponds to a sitting user position, and said second distance corresponds to a standing user position.*

*21. The vertically adjustable mobile computer workstation of claim 20 further comprising an internal force producing device having a pneumatic cylinder coupled between said first arm and said second arm.*

\* \* \* \* \*